United States Patent [19]

Tsuzuki et al.

[11] 4,343,229

[45] Aug. 10, 1982

[54] ASSEMBLED PISTON FOR ENGINE

[75] Inventors: Yoshihiko Tsuzuki, Nagoya; Kiyoshi Uchida; Toshio Tanahashi, both of Toyota, all of Japan

[73] Assignee: Toyota Jidosha Kogyo Kabushiki Kaisha, Toyota, Japan

[21] Appl. No.: 35,682

[22] Filed: May 3, 1979

[30] Foreign Application Priority Data

Jun. 15, 1978 [JP] Japan ............................ 53-725870

[51] Int. Cl.³ ............................................ F16J 1/00

[52] U.S. Cl. ................................ 92/212; 92/218; 92/224

[58] Field of Search ................ 92/172, 212, 218, 220, 92/224, 217, 255; 123/193 P

[56] References Cited

U.S. PATENT DOCUMENTS

| | | | |
|---|---|---|---|
| 1,513,568 | 10/1924 | Talbot | 92/220 X |
| 1,548,329 | 8/1925 | Nelson | 92/220 X |
| 1,609,449 | 12/1926 | Williams | 92/218 X |
| 1,627,400 | 5/1927 | Meyer | 92/218 X |
| 2,657,961 | 11/1953 | Lassberg | 92/212 |
| 3,136,306 | 6/1964 | Kamm | 92/212 X |
| 4,128,092 | 12/1978 | Yokota et al. | 123/193 P |

FOREIGN PATENT DOCUMENTS

| | | | |
|---|---|---|---|
| 757771 | 1/1934 | France | 92/218 |
| 53-82606 | 7/1978 | Japan . | |
| 53-116505 | 9/1978 | Japan . | |
| 53-127008 | 10/1978 | Japan . | |
| 53-127009 | 10/1978 | Japan . | |

*Primary Examiner*—Irwin C. Cohen
*Attorney, Agent, or Firm*—Brisebois & Kruger

[57] ABSTRACT

An engine piston composed of a head and a body separately formed from the head. The head is of ceramic material and the body is light metal or light alloy. The head and the body are connected against axial movement by interengagement of inclined surfaces on the head and body by rotation of the head relative to the body, and the head and body are then fixed against relative rotation by an anti-turning device, this arrangement preventing development of excessive thermal stress. The piston is of reduced weight, can be mass-produced, and reduces fuel consumption.

13 Claims, 5 Drawing Figures

ASSEMBLED PISTON FOR ENGINE

BACKGROUND OF THE INVENTION

1. Field of the Invention

The present invention relates to an assembled or fabricated piston, consisting partly of ceramic material, for internal or external combustion engines.

2. Description of the Prior Art

Conventionally an engine piston is integrally molded of aluminum material, but lately for the purpose mainly of reducing fuel cost and improving the performance there has been an increased need for an assembled piston in which the head facing the combustion chamber and the body are constructed as separate pieces, the head being fabricated of a material with good heat insulation such as amber or sintered stainless steel and then being consolidated with a piston body.

In the present practice of manufacturing an assembled piston, the head and the body are bolted together at the center of the piston; or a part of the head made of material other than aluminum is integrally cast into the aluminum body when the body is cast in a mold.

This mode of fastening the head and the body, however, has the drawback that under repeated operation of the engine a difference in the thermal expansion between the head and the body causes repeated stress and deformation variations, resulting in the two parts getting loose, which may lead to engine trouble, trouble in cooling the head, or trouble in sealing.

Moreover, if the head is made of amber or sintered stainless, the piston becomes heavy, resulting in poor performance of the engine.

SUMMARY OF THE INVENTION

The primary object of the present invention is to provide a firmly fastened, assembled piston for an engine, and a stable fastening structure, in which a head of ceramic material can be stably fastened to a metal body without developing a gap between them in spite of their differences in thermal expansion and without developing excessive thermal stress in the head.

Another object of the present invention is to provide an assembled piston for an engine in which ceramic material is used to reduce the piston weight and thereby increase the engine output.

Still another object of the present invention is to provide an assembled piston for an engine in which the head facing the combustion chamber is fabricated of ceramic material, thereby improving heat insulation, saving fuel, and improving combustion.

Still another object of the present invention is to provide an assembled piston for an engine which is of low-cost and easily moldable with high precision in shape and size by using glass ceramic, silicon nitride, silicon carbide or alumina as the structural material of the head.

Other objects and many of the attendant advantages of this invention will be readily appreciated as the same becomes better understood by reference to the following detailed description when considered in connection with the accompanying drawings, in which like reference characters designate the same or similar parts throughout the figures thereof.

DETAILED DESCRIPTION OF THE INVENTION

Figure 1:
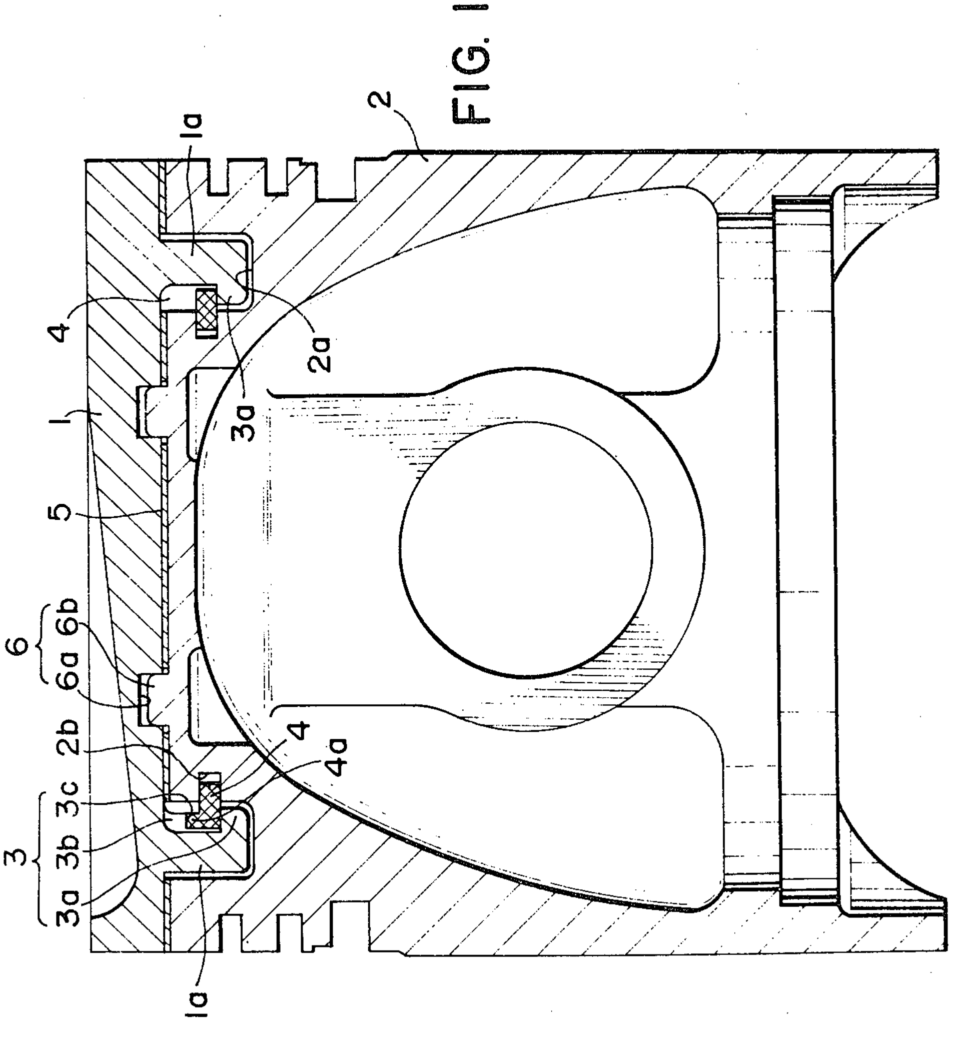
FIG. 1 is a view in axial section of an assembled piston for an engine according to one embodiment of the present invention.

The assembled engine piston for one embodiment of the invention will now be described referring to the drawings.

In FIG. 1, 1 is the head, and 2 is the body; and the two are formed as separate pieces. The head 1 is made of ceramic material, advantageously, selected from the group consisting of a high-strength glass ceramic (crystallized glass), silicon nitride, silicon carbide and alumina. Among others, glass ceramic is found advantageous in that it is as strong as the conventional amber or sintered stainless steel; it contributes to weight-reduction and cost-reduction; and high precision of the inclined surface to be formed is assured because it is moldable like molten glass to a desired shape, and is easy to blow-form or press-form by using a mold without machining. After forming it is submitted to crystallizing treatment. The glass ceramic to be used desirably has a softening point of over 600° C. and a bending strength of over 10 $Kg/mm^2$ in view of the piston being used in an automobile.

The body 2 consists of light metal like aluminum or light alloy like aluminum alloy. After casting the body 2 in a mold, the peripheral surface and the grooves to fit the piston rings are finished by machining.

On the periphery of the head 1 is an annular projection 1*a* extending axially toward the body 2, the bottom end of the projection constituting a bulge or flange 3*a* which extends radially inwardly of the piston. The top surface of the flange 3*a* is generally flat, constituting a part of a connecting means 3. At the base of the interior of head 1 opposing flange 3*a* there is a downwardly projecting boss or lug 3*b* (FIGS. 1 and 3) extending over a definite length in the circumferential direction of the piston, the lug 3*b* also constituting a part of the connecting means 3. On the underside of lug 3*b* there is an inclined surface 3*c* gradually rising or falling in the circumferential direction. The inclination of the inclined surface 3*c* is desirably slight and its face is desirably wide. It is necessary that at least one lug 3*b* and one inclined surface 3*c* be provided circumferentially of the piston but a plurality of them can be provided.

The body 2 is a cylindrical piece with an integral top end having an axially extending annular groove 2*a* to receive the projection 1*a* of the head 1. An annular radial groove 2*b* is formed in the inner side wall of groove 2*a*, and opens into groove 2*a*. Groove 2*b* constitutes an engaged part of connecting means 3.

Figure 2:
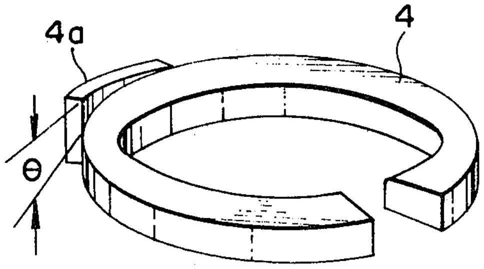
FIG. 2 is an oblique view showing a connecting means for the head and body of FIG. 1.
Figure 2A:
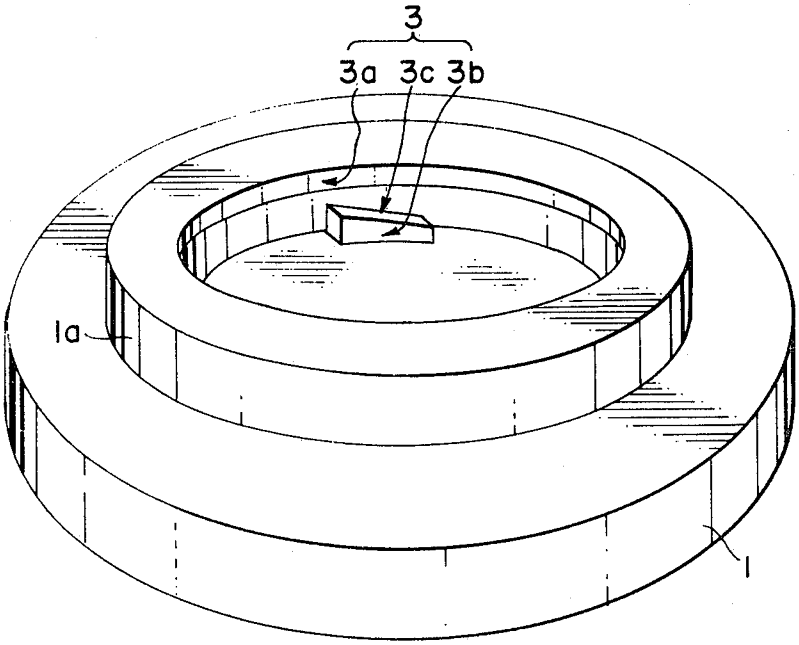
FIG. 2a is an oblique view of the head of the piston in FIG. 1.

In groove 2*b* there is a split ring 4 of a vertical height to be a very close fit in the groove 2*b*. Ring 4 (FIG. 2) constitutes an engaging part of a cooperating connecting means, having a portion extending into groove 2*a*. It is for the purpose of enabling the ring 4 to fit into groove $2a$ that the ring 4 is constructed in the form of a split ring. Of course, the ring 4 can be composed of a plurality of pieces which extend in the circumferential direction of the piston. On the part of ring 4 outside groove $2b$ there is an inclined surface $4a$ engageable with inclined surface $3c$ of the lug $3b$ of the piston head, over a certain extent in the circumferential direction, the surfaces $3c$ and $4a$ having the same angle of inclination.

In assembling the piston, at first the split ring is fitted in the groove $2b$ of body 2 and is compressed radially; then the projection $1a$ of the head 1 is pushed into the groove $2a$ so the inner surface of flange $3a$ holds the ring compressed. When the upper edge of flange $3a$ passed below the lower edge of ring 4, the ring is released and expands radially to connect the head 1 to body 2. Thereupon the head 1 is turned in a circumferential direction in relation to the body, thus causing engagement of the two inclined surfaces $3c$ and $4a$. With the top of the flange $3a$ and the bottom of ring 4, and surfaces $3c$ and $4a$ in close engagement with each other simultaneously, the head 1 is fastened to the body with no gap in the axial direction of the piston.

The fastened state can be maintained unless the head 1 is turned relative to the body 2 in such direction that the inclined surface $3c$ and the inclined surface $4a$ separate from each other; but to guarantee the maintenance of this state, an anti-turning arrangement 6 is provided to prevent turning. This arrangement 6 can be anything routine such as a pin or a washer, so long as it prevents a relative turning between the head 1 and the body 2. FIG. 1 illustrates an example in which the anti-turning arrangement 6 is formed by extruding the body 2 either while cold or hot into a cavity $6a$ (or several holes) of the head 1 after assembling, thereby engaging the boss $6b$ in the cavity $6a$.

In the present embodiment a spacer 5 is placed between the head 1 and the body 2 for the purpose of adjusting the axial engagement between the interengaging portions of the head, ring, and body, and providing a cushion action between them. The spacer 5 can be made of copper.

The above is a case of the connecting means 3 being formed on the head 1 and the cooperating connecting means in the form of ring 4 being separately provided on the body; but it goes without saying that the ring 4 may be provided on the head 1 and the connecting means 3 on the body 2.

In the above embodiment the ring 4 is provided as a separate piece from the head 1 or the body 2, but it can be formed integrally with either the head or the body. In the latter case, for reason of assembling, the interengaging surfaces should be finished to a certain extent in the circumferential direction; then after the two parts are provisionally assembled without contacting each other, the head 1 should be turned relative to the body, thereby causing interengagement to secure the head and body together. This is shown in FIG. 3.

Figure 3:
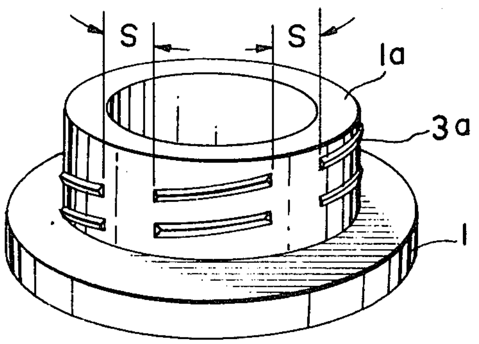
FIG. 3 is an oblique view of the piston head in another embodiment of the invention.
Figure 3A:
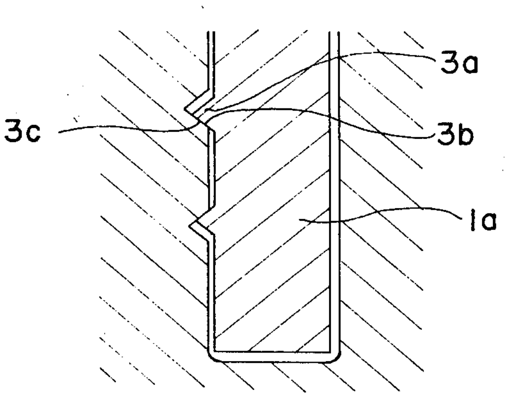
FIG. 3a is a partial view in axial section showing the piston head of FIG. 3 connected to another piston body.

In FIG. 3 inclined threads $3a$ as often seen on a glass cap are formed around the projection $1a$ of the head 1; the threads being intermittent along lengths S. The anti-turning device and other parts are structurally the same as described above.

On the body, to engage the male threads $3a$ a female thread $3b$ is provided. Where the threads on head 1 take the form of the intermittent threads $3a$, vertical slots of a width equal to the length of threads $3a$ and of a depth equal to the radial height of the threads $3a$ are formed in body 2. The regions between the slots project into the areas S and have mating female threads $3b$ formed therein.

The screw thread need not always be an angular one; an inclined surface will suffice. The thread may be regarded as an engaging means with a partial inclination.

The assembled engine piston according to the present invention has various functions and effects as follows:

A. Use of ceramic material (especially glass ceramic) for the head provides the following merits:

1. The head is easy to mold to form an inclined surface or a projection or a cavity; and it is suitable for mass production;
2. On account of low thermal conductivity, the engine is thermally well insulated, thereby saving fuel and improving combustion;
3. On account of low specific gravity, the ceramic material, unlike conventional heat insulating material, contributes to weight reduction of the piston;
4. If glass ceramic is employed, sufficient strength is assured, and molding can be done with sufficient precision before crystallizing treatment, resulting in a high-precision high-strength head;
5. Glass ceramic, unlike the conventional sintered ceramic, prevents abnormal abrasion of engine parts due to worn particles; and
6. Glass ceramic can be adapted to a certain extent to the rate of thermal expansion of the mating metal.

B. Since the union of head and body is effected by engagement of inclined surfaces, a possible slackness developed in the rotational direction under repeated load and deformation taking place by the difference in thermal expansion can be mitigated in the axial direction of the piston by the extent of inclination; namely, putting the angle of inclination as $\theta$, the axial clearance can be expressed by the product (rotational clearance$\times$tan $\theta$) and accordingly the axial clearance can be held down to a magnitude that can be virtually neglected.

C. Since the engagement is done between inclined surfaces, the areas of engagement can be made wide enough to prevent damage.

D. Since the rotational clearance is restrained by an anti-turning device, it is possible to lock the head in the body with practically no clearance.

What is claimed is:

1. An assembled engine piston comprising a hollow metal body having an axially extending annular groove in a top end thereof, said groove opening through a top surface of said body, the metal of the body being selected from the group consisting of aluminum or an aluminum alloy, a unitary ceramic material head on the top of said body, said head comprising an end wall covering the top end of the body and an axially extending annular projection extending into said groove, radially extending interengaging means within said annular groove and carried by said projection and said body for securing said head to said body against relative axial movement, said interengaging means comprising, first and second inclined surfaces movable into a position of mating engagement in response to rotation of said head with respect to said body to tightly seat the head on the body and means to prevent relative rotation of said head and body, after assembly, said means comprising, a closed end cavity formed in said head, said cavity opening toward said body, and a boss deformed into said cavity by cold or hot pressing a portion of the body into the cavity from inside the body.

2. Assembled piston of claim 1, wherein the ceramic material of said head is one selected from among crystallized glass, alumina, silicon nitride and silicon carbide.

3. Assembled piston of claim 2, wherein said crystallized glass has a softening point of over 600° C. and a bending strength of over 10 $Kg/mm^2$.

4. Assembled piston to claim 1, wherein said head comprises a molded head.

5. Assembled piston according to claim 1 wherein said first inclined surface is carried by an inner wall of the axially extending annular groove, and said second inclined surface is carried by an inner surface of said annular projection.

6. Assembled piston of claim 5, wherein said interengaging means comprises a split ring of elastic metal compressible during assembling the head into the body so it becomes smaller than the inner diameter of said annular projection of the head, and when released becomes thicker than the inner diameter of said annular projection in the head, said first inclined surface being formed on said ring.

7. Assembled piston of claim 6, wherein said first inclined surface extends only over a part of the ring's circumference and beyond the ring's radius.

8. Assembled piston of claim 1, wherein said first inclined surface comprises an integral surface on the outside wall of said annular groove in the body and projecting into said annular groove, and said second surface comprises an integral surface on the outside of said annular projection of the head.

9. Assembled piston of claim 8, wherein said first and second inclined surfaces extend only partly in the circumferential direction so that said surfaces can go past each other when said annular projection of the head is inserted into said annular groove of the body for head-body assembling.

10. Assembled piston of claim 1, wherein a spacer is placed between the top of the body and the bottom of the head.

11. Assembled piston of claim 10, wherein said spacer is fabricated of copper.

12. An assembled piston according to claim 1 wherein, said radially extending interengaging means comprises axially extending screw threads on a wall of said annular groove, and mating screw threads on a face of said annular projection.

13. Assembled piston according to claim 12 wherein said threads are each circumferentially discontinuous.

* * * * *